(12) United States Patent
Sakamoto

(10) Patent No.: US 10,397,426 B2
(45) Date of Patent: Aug. 27, 2019

(54) INFORMATION PROCESSING SYSTEM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Daiki Sakamoto, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 15/464,653

(22) Filed: Mar. 21, 2017

(65) Prior Publication Data
US 2018/0227451 A1    Aug. 9, 2018

(30) Foreign Application Priority Data

Feb. 9, 2017   (JP) .................................. 2017-022245

(51) Int. Cl.
*H04N 1/00* (2006.01)

(52) U.S. Cl.
CPC ..... *H04N 1/00822* (2013.01); *H04N 1/00015* (2013.01); *H04N 1/00018* (2013.01); *H04N 1/00225* (2013.01); *H04N 1/00233* (2013.01); *H04N 1/00244* (2013.01); *H04N 1/00411* (2013.01); *H04N 1/00307* (2013.01); *H04N 2201/0094* (2013.01)

(58) Field of Classification Search
CPC ........... H04N 1/00822; H04N 1/00244; H04N 1/00018; H04N 1/00411; H04N 1/00015; H04N 2201/0094
See application file for complete search history.

(56) References Cited

U.S. PATENT DOCUMENTS

| | | | |
|---|---|---|---|
| 8,520,267 B2* | 8/2013 | Hong | H04N 1/00225 358/1.15 |
| 2006/0184510 A1* | 8/2006 | Nishio | H04L 12/2803 |
| 2009/0158277 A1 | 6/2009 | Bunker | |
| 2009/0174897 A1* | 7/2009 | Sato | H04N 1/00411 358/1.15 |

(Continued)

FOREIGN PATENT DOCUMENTS

JP   2003-84925   3/2003

OTHER PUBLICATIONS

A Simple Network Management Protocol (SNMP), The Internet Engineering Task Force (IETF), https://www.ietf.org/rfc/rfc1157.txt, May 1, 1990.

(Continued)

*Primary Examiner* — Ming Y Hon
(74) *Attorney, Agent, or Firm* — Amin, Turocy & Watson LLP

(57) ABSTRACT

According to one embodiment, an information processing method includes instructing a multifunction peripheral performing scanning and printing to perform setting regarding scanning, transmitting a scan signal for performing scanning to the multifunction peripheral, instructing the multifunction peripheral to perform setting regarding printing, and transmitting a print signal for printing a scan image obtained through scanning to the multifunction peripheral.

5 Claims, 18 Drawing Sheets

(56) References Cited

U.S. PATENT DOCUMENTS

| | | | |
|---|---|---|---|
| 2009/0260017 A1* | 10/2009 | Yoshida | G06F 9/5038 |
| | | | 718/105 |
| 2010/0225957 A1* | 9/2010 | Liu | G06F 9/4411 |
| | | | 358/1.15 |
| 2011/0302396 A1* | 12/2011 | Takano | H04N 1/00204 |
| | | | 712/226 |
| 2012/0218589 A1 | 8/2012 | Watanabe et al. | |
| 2014/0029035 A1 | 1/2014 | Maruyama et al. | |
| 2014/0253933 A1* | 9/2014 | Selvaraj | H04N 1/00503 |
| | | | 358/1.13 |
| 2015/0154482 A1 | 6/2015 | Kawai | |
| 2015/0222769 A1* | 8/2015 | Hino | H04N 1/00477 |
| | | | 358/1.15 |
| 2016/0006890 A1* | 1/2016 | Hayakawa | H04N 1/00228 |
| | | | 358/1.15 |

OTHER PUBLICATIONS

Implementing Web Services on Devices for Printing, Microsoft, https://msdn.microsoft.com/en-us/library/windows/hardware/dn641604(v=vs.85).aspx, Apr. 29, 2015.
Management Information Base (MIB) for the Simple Network Management Protocol (SNMP), The Internet Engineering Task Force (IETF), https://www.ietf.org/rfc/rfc3418.txt, Dec. 1, 2002.
Extended European Search Report for European Patent Application No. 18153094.0 dated Jun. 7, 2018, 10 Pages.

* cited by examiner

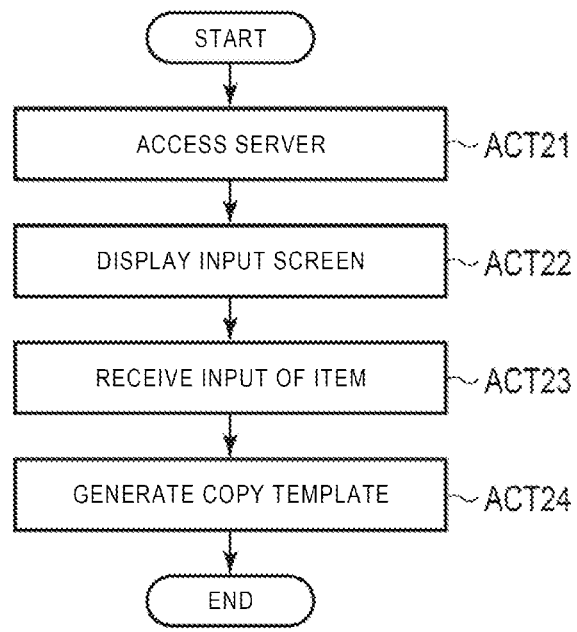

FIG. 16

```
<wscn:ScanTicket>
  <wscn:JobDescription>
    <wscn:JobName>ScanJob for Den PC</wscn:JobName>
    ...
  </wscn:JobDescription>
  <wscn:DocumentParameters>
    <wscn:Format>jfif</wscn:Format>
    ...
    <wscn:Exposure>
      <wscn:AutoExposure>true</wscn:AutoExposure>
    </wscn:Exposure>
    ...
  </wscn:DocumentParameters>
</wscn:ScanTicket>
```

FIG. 19

```
<wprt:PrintTicket>
  <wprt:JobDescription>
    <wprt:JobName>Example Document</wprt:JobName>
    ...
  </wprt:JobDescription>
  <wprt:JobProcessing>
    <wprt:Copies>1</wprt:Copies>
    ...
  </wprt:JobProcessing>
  <wprt:DocumentProcessing>
    <wprt:MediaSizeName>na_letter_8.5x11in</wprt:MediaSizeName>
    <wprt:NumberUp>
      <wprt:PagesPerSheet>4</wprt:PagesPerSheet>
      <wprt:Direction>RightDown</wprt:Direction>
    </wprt:NumberUp>
    <wprt:Orientation>Portrait</wprt:Orientation>
    ...
    <wprt:Sides>TwoSidedLongEdge</wprt:Sides>
  </wprt:DocumentProcessing>
</wprt:PrintTicket>
```

INFORMATION PROCESSING SYSTEM

CROSS-REFERENCE TO RELATED APPLICATION

This application is based upon and claims the benefit of priority from Japanese Patent Application No. 2017-022245, filed Feb. 9, 2017, the entire contents of which are incorporated herein by reference.

FIELD

Embodiments described herein relate generally to an information processing method and an information processing apparatus.

BACKGROUND

There is a mobile terminal which acquires a copy template (copy setting) set in a multifunction peripheral (MFP) at a visit place from a server in order to perform copying at the visit place or the like. The mobile terminal sets the copy template in the MFP during copying.

However, in the related art, there is a problem in that an MFP does not cope with a copy template, and a mobile terminal cannot set the copy template in the MFP.

DESCRIPTION OF THE DRAWINGS

FIG. 8 is a diagram illustrating an example of a copy template.

FIG. 9 is a flowchart illustrating an operation example of the user terminal.

FIG. 16 is a diagram illustrating an example of a scan setting file.

FIG. 19 is a diagram illustrating an example of a print setting file.

DETAILED DESCRIPTION

An object of exemplary embodiments is to provide an information processing method and an information processing apparatus capable of performing copying according to a predetermined copy setting regardless of a model of a multifunction peripheral.

In general, according to one embodiment, there is provided an information processing method including instructing a multifunction peripheral performing scanning and printing to perform setting regarding scanning, transmitting a scan signal for performing scanning to the multifunction peripheral, instructing the multifunction peripheral to perform setting regarding printing, and transmitting aprint signal for printing a scan image obtained through scanning to the multifunction peripheral.

Hereinafter, an embodiment will be described with reference to the drawings.

A copy system according to an embodiment performs copying by using an MFP according to a copy template (copy settings) which is set in advance by a user. For example, the copy system stores the copy template set by the user in a server in advance. The copy system sets the copy template stored in the server in an MFP located at a predetermined place via a mobile terminal of the user. The copy system performs copying by using the MFP.

For example, the copy system is used for the user to perform copying at a visit place. For example, the copy system sets the copy template which is transmitted to the server by the user in an office or the like, in an MFP at a visit place such as a place which the user is doing business with.

Figure 1:
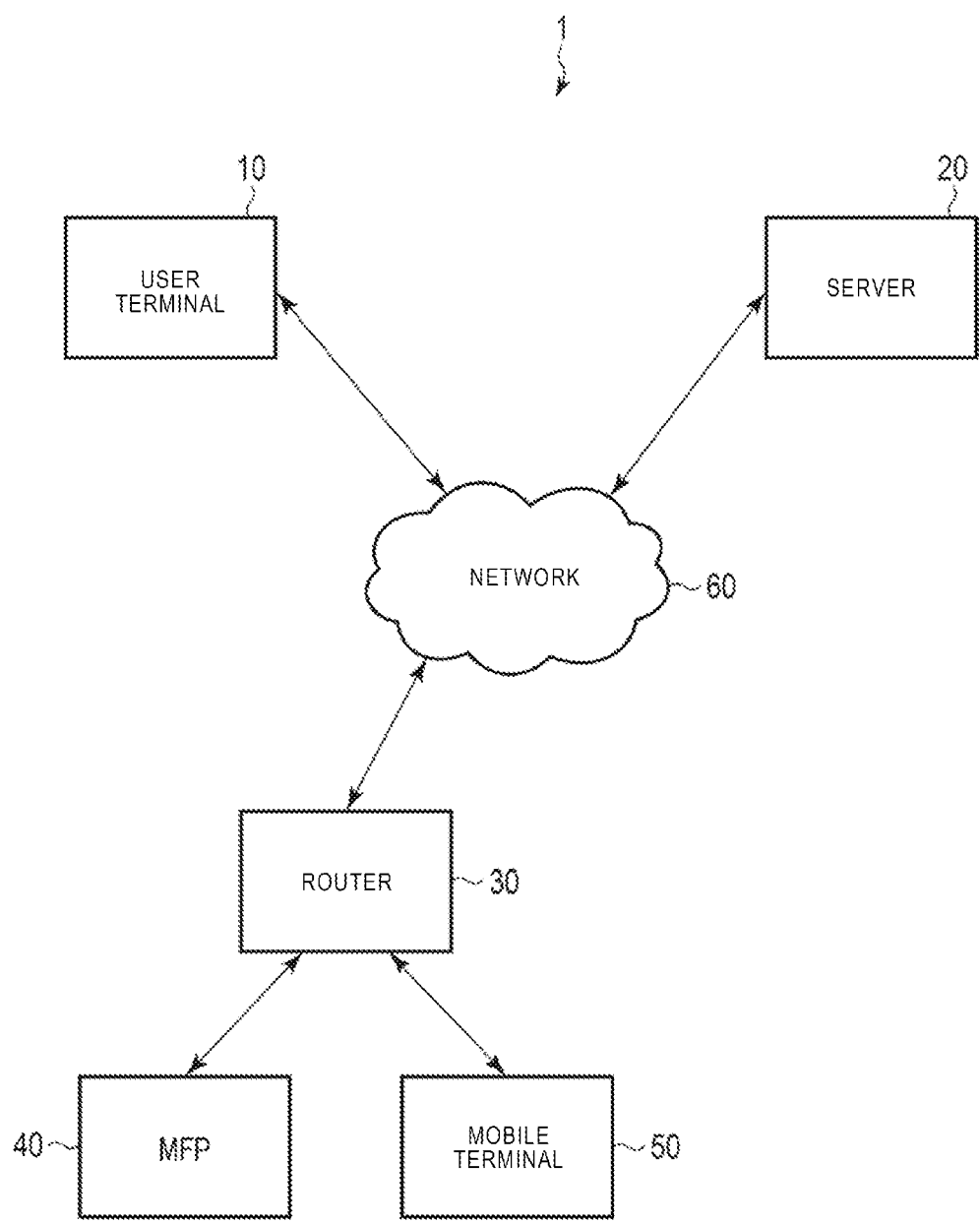
FIG. 1 is a block diagram illustrating a configuration example of a copy system according to an embodiment.

FIG. 1 is a block diagram illustrating a configuration example of a copy system 1 according to an embodiment.

As illustrated in FIG. 1, the copy system 1 includes a user terminal 10, a server 20, a router 30, an MFP 40, a mobile terminal 50, and the like. The copy system 1 may be provided with a necessary constituent element in addition to the constituent elements illustrated in FIG. 1 or may exclude a specific constituent element.

The user terminal 10 allows a user to input a copy template. For example, the user terminal 10 is provided in, for example, the user's office or home. The user terminal 10 transmits the copy template to the server 20 via a network 60.

The server 20 (information processing apparatus) stores the copy template. The server 20 transmits the copy template to the mobile terminal 50 via the network 60.

The router 30 is connected to the network 60. The router 30 communicates with the MFP 40, the mobile terminal 50, and the like. For example, the router 30 performs wireless communication with the MFP 40, the mobile terminal 50, and the like by building a wireless network such as a wireless LAN.

The router 30 transmits data from the mobile terminal 50 and the like to the network 60. The router 30 may transmit data from the network 60 to the mobile terminal 50 and the like. The router 30 may transmit data from the mobile terminal 50 to the MFP 40. The router 30 may transmit data from the MFP 40 to the mobile terminal 50.

The network 60 is a communication network for transmitting and receiving data between the user terminal 10 and the server 20, between the router 30 and the server 20, and the like. For example, the network 60 is the Internet. The network 60 may be an independent communication network.

The MFP 40 (multifunction peripheral) scans an original document on the basis of signals or the like from the mobile terminal 50. The MFP 40 prints images on the basis of signals or the like from the mobile terminal 50. The MFP 40 transmits and receives data to and from the mobile terminal 50. For example, the MFP 40 may transmit and receive data to and from the mobile terminal 50 via the router 30. The MFP 40 may directly transmit and receive data to and from the mobile terminal 50.

The mobile terminal 50 is carried by a user. For example, the user carries the mobile terminal 50 to a place which the user is doing business with, and uses the mobile terminal there. The mobile terminal 50 acquires the copy template from the server 20, and sets the copy template in the MFP 40. The mobile terminal 50 transmits a scan signal for starting scanning and a print signal for starting printing to the MFP 40.

Next, the user terminal 10 will be described.

Figure 2:
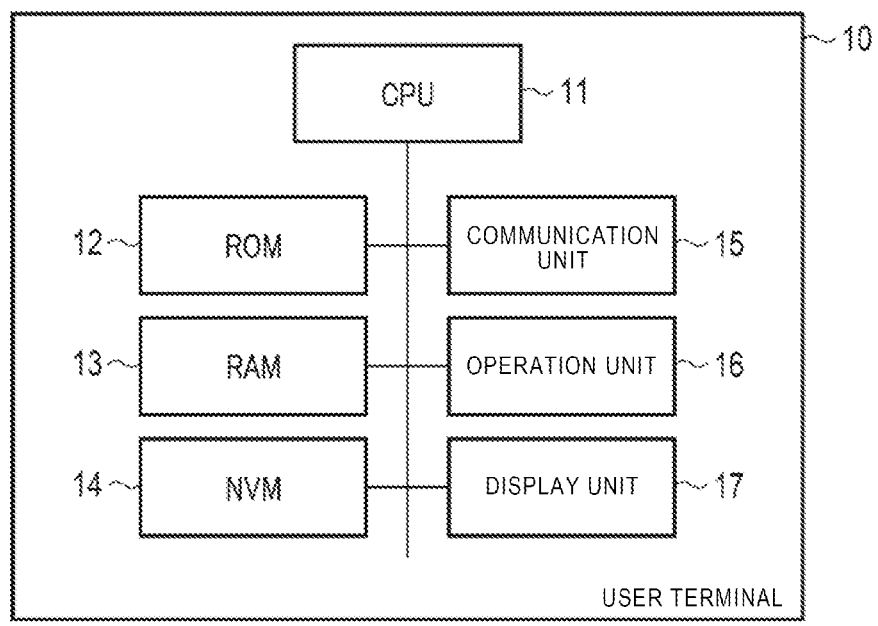
FIG. 2 is a block diagram illustrating a configuration example of a user terminal.

FIG. 2 is a block diagram illustrating a configuration example of the user terminal 10.

As illustrated in FIG. 2, the user terminal 10 includes, as a fundamental configuration, a CPU 11, a ROM 12, a RAM 13, an NVM 14, a communication unit 15, an operation unit 16, a display unit 17, and the like. The respective units are connected to each other via a data bus. The user terminal 10 may be provided with a necessary constituent element in addition to the constituent elements illustrated in FIG. 2 or may exclude a specific constituent element.

The CPU 11 has a function of controlling the entire operation of the user terminal 10. The CPU 11 may be provided with, for example, a built-in cache and various interfaces. The CPU 11 performs various processes by executing programs stored in an internal memory, the ROM 12, or the NVM 14.

Some functions realized by the CPU 11 executing the programs may be realized by a hardware circuit. In this case, the CPU 11 controls the functions realized by the hardware circuit.

The ROM 12 is a nonvolatile memory in which a control program, control data, and the like are stored in advance. The control program and the control data stored in the ROM 12 are incorporated in advance depending on a specification of the user terminal 10. The ROM 12 stores, for example, a program (for example, BIOS) for controlling a circuit board of the user terminal 10.

The RAM 13 is a volatile memory. The RAM 13 temporarily stores data or the like which is being processed by the CPU 11. The RAM 13 stores various application programs on the basis of commands from the CPU 11. The RAM 13 may store data required to execute the application programs and execution results of the application programs.

The NVM 14 is a data readable and writable nonvolatile memory. The NVM 14 is formed of, for example, a hard disk, an SSD, an EEPROM (registered trademark), or a flash memory. The NVM 14 stores a control program, an application, and various pieces of data depending on an operation purpose of the user terminal 10.

The communication unit 15 is an interface for transmitting and receiving data to and from the server 20 via the network 60. The communication unit 15 transmits predetermined data to the server 20 according to a signal from the CPU 11. The communication unit 15 transmits data received from the server 20 to the CPU 11.

For example, the communication unit 15 may support LAN connection.

The operation unit 16 receives various operation instructions from the user of the user terminal 10. The operation unit 16 transmits a signal corresponding to an operation instruction which is input by the user to the CPU 11. The operation unit 16 is, for example, a keyboard, ten keys, and a touch panel.

The display unit 17 is a display device displaying various pieces of information under the control of the CPU 11. The display unit 17 is, for example, a liquid crystal monitor. If the operation unit 16 is formed of a touch panel or the like, the display unit 17 may be integrally formed with the operation unit 16.

Next, the server 20 will be described.

Figure 3:
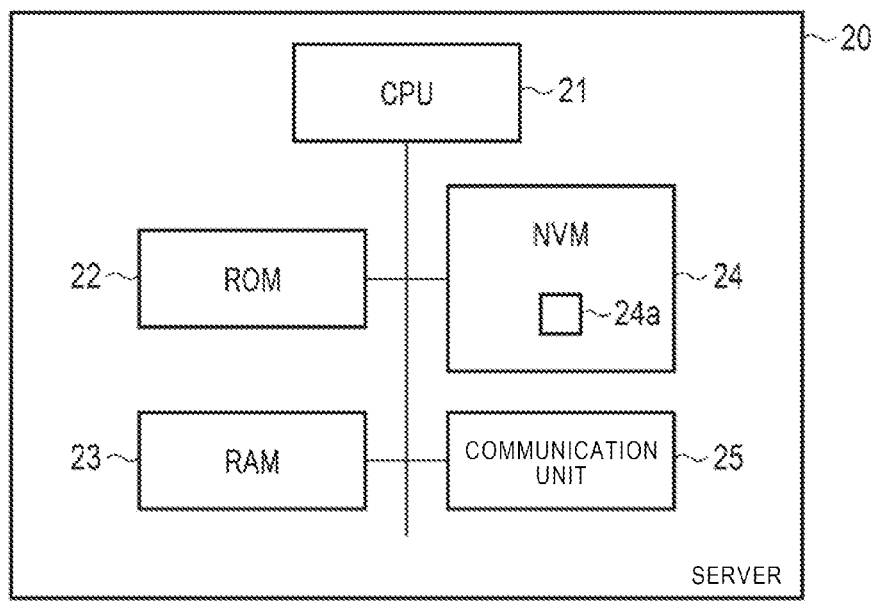
FIG. 3 is a block diagram illustrating a configuration example of a server.

FIG. 3 is a block diagram illustrating a configuration example of the server 20.

As illustrated in FIG. 3, the server 20 includes, as a fundamental configuration, a CPU 21, a ROM 22, a RAM 23, an NVM 24, and a communication unit 25, and the like. The respective units are connected to each other via a data bus. The server 20 may be provided with a necessary constituent element in addition to the constituent elements illustrated in FIG. 3 or may exclude a specific constituent element.

The CPU 21 (processing unit) has a function of controlling the entire operation of the server 20.

The ROM 22 is a nonvolatile memory in which a control program, control data, and the like are stored in advance.

The RAM 23 is a volatile memory.

The NVM 24 (storage unit) is a data readable and writable nonvolatile memory.

The NVM 24 is provided with a storage region 24*a* storing the copy template. The copy template will be described later.

The communication unit 25 is an interface for transmitting and receiving data to and from the user terminal 10 and the router 30 via the network 60.

Next, the MFP 40 will be described.

Figure 4:
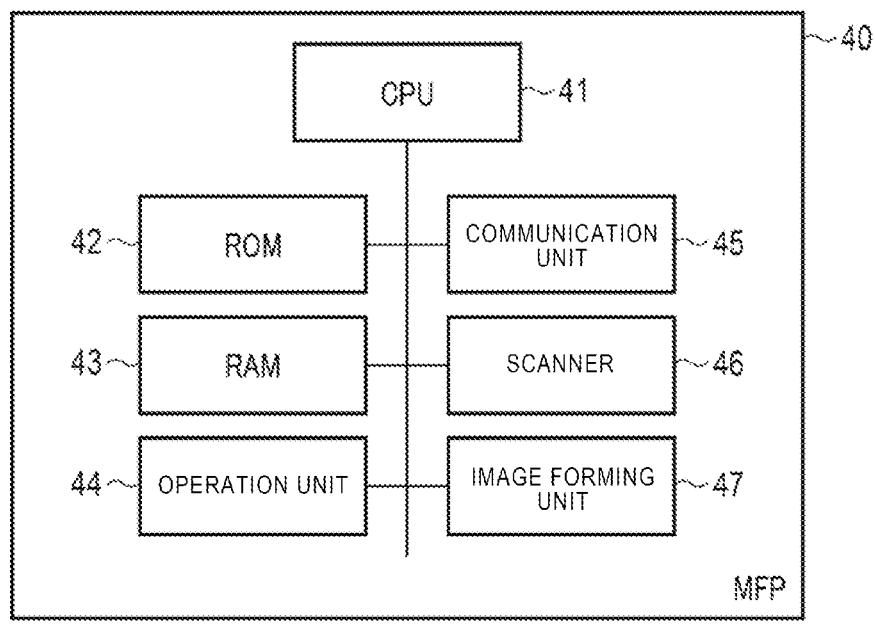
FIG. 4 is a block diagram illustrating a configuration example of an MFP.

FIG. 4 is a block diagram illustrating a configuration example of the MFP 40.

As illustrated in FIG. 4, the MFP 40 includes, as a fundamental configuration, a CPU 41, a ROM 42, a RAM 43, an operation unit 44, a communication unit 45, a scanner 46, an image forming unit 47, and the like. The respective units are connected to each other via a data bus. The MFP 40 may be provided with a necessary constituent element in addition to the constituent elements illustrated in FIG. 4 or may exclude a specific constituent element.

The CPU 41 has a function of controlling the entire operation of the MFP 40.

The ROM 42 is a nonvolatile memory in which a control program, control data, and the like are stored in advance.

The RAM 43 is a volatile memory. The RAM 43 may temporarily store an image read by the scanner 46, a copy image transmitted from an external device, and the like.

The operation unit 44 receives various operation instructions from a user of the MFP 40. The operation unit 44 transmits a signal corresponding to an operation instruction which is input by the user to the CPU 41. The operation unit 44 is, for example, a keyboard, ten keys, and a touch panel.

The communication unit 45 is an interface for transmitting and receiving data to and from the router 30 and the mobile terminal 50. For example, the communication unit 45 may support LAN connection. The communication unit 45 may directly transmit and receive data to and from the mobile terminal 50. The communication unit 45 may transmit and receive data to and from the mobile terminal 50 via the router 30.

The scanner 46 reads an image on the basis of a signal from the CPU 41. For example, the scanner 46 reads an original document set on a platen of the MFP 40. For example, the scanner 46 may have a configuration of reading an original document by moving a group of linearly disposed sensors. The scanner 46 may have a configuration of reading an original document by moving the original document over the sensor group. A configuration of the scanner 46 is not limited to a specific configuration.

The scanner 46 transmits the read image to the CPU 41. The scanner 46 may store the read image in the RAM 43, an image memory, or the like.

The image forming unit 47 prints an image on paper on the basis of a signal or the like from the CPU 41. For example, the image forming unit 47 is formed of a feeding portion feeding paper and a printing portion printing an image on paper.

The image forming unit 47 takes out paper from the feeding portion, and carries the paper to the printing portion. The image forming unit 47 forms an image on the paper by using the printing portion. The printing portion forms an image on the paper according to, for example, an electrophotographic method or an ink jet method. If the paper is heat sensitive paper, the printing portion forms an image by heating the paper. A configuration of the image forming unit 47 is not limited to a specific configuration.

Next, the mobile terminal 50 will be described.

Figure 5:
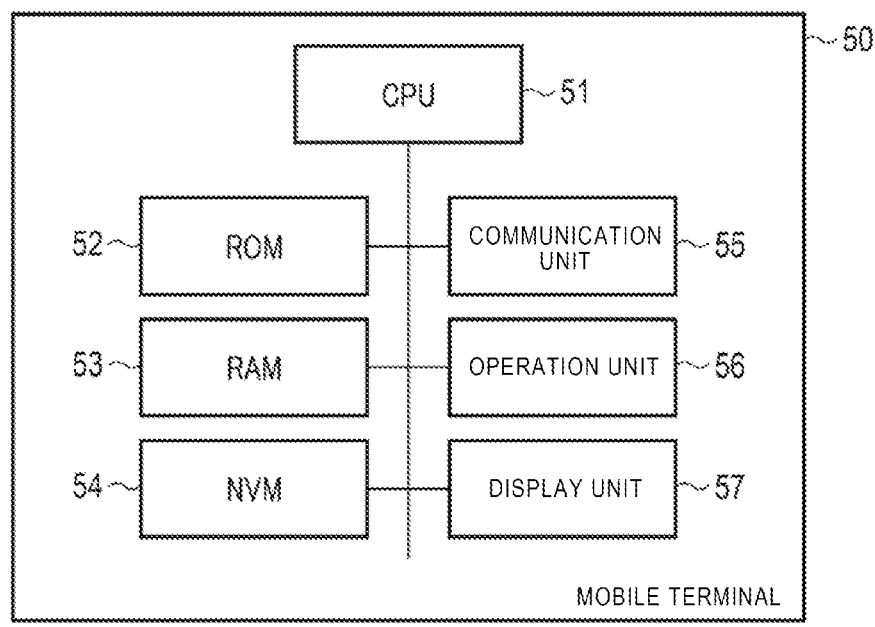
FIG. 5 is a block diagram illustrating a configuration example of a mobile terminal.
Figure 6:
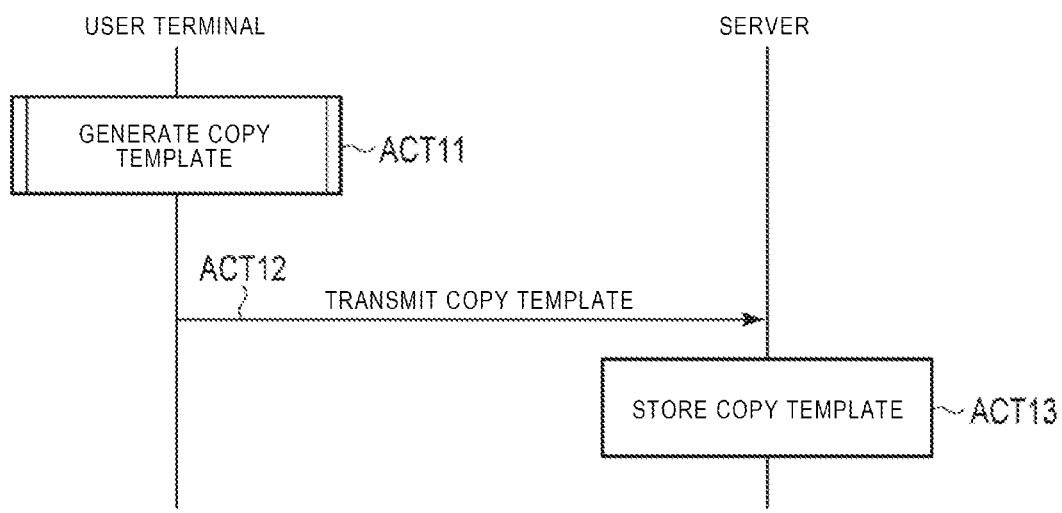
FIG. 6 is a sequence diagram illustrating an operation example of the copy system.

FIG. 5 is a block diagram illustrating a configuration example of the mobile terminal 50.

As illustrated in FIG. 5, the mobile terminal 50 includes, as a fundamental configuration, a CPU 51, a ROM 52, a RAM 53, an NVM 54, a communication unit 55, an operation unit 56, a display unit 57, and the like. The respective units are connected to each other via a data bus. The mobile terminal 50 may be provided with a necessary constituent element in addition to the constituent elements illustrated in FIG. 5 or may exclude a specific constituent element.

The CPU 51 (processor) has a function of controlling the entire operation of the mobile terminal 50.

The ROM 52 is a nonvolatile memory in which a control program, control data, and the like are stored in advance.

The RAM 53 is a volatile memory.

The NVM 54 is a data readable and writable nonvolatile memory.

The communication unit 55 is an interface for transmitting and receiving data to and from the router 30 and the MFP 40. For example, the communication unit 55 may support LAN connection. The communication unit 55 may directly transmit and receive data to and from the MFP 40. The communication unit 55 may transmit and receive data to and from the MFP 40 via the router 30.

The operation unit 56 receives various operation instructions from a user of the mobile terminal 50. The operation unit 56 transmits a signal corresponding to an operation instruction which is input by the user to the CPU 51. The operation unit 56 is, for example, a keyboard, ten keys, and a touch panel.

The display unit 57 is a display device displaying various pieces of information under the control of the CPU 51. The display unit 57 is, for example, a liquid crystal monitor.

Here, the operation unit 56 is assumed to be formed of a touch panel or the like and to be integrally formed with the display unit 57.

Next, a description will be made of an operation example of the copy system 1.

First, a description will be made of an operation example in which the copy system 1 stores a copy template in the server 20.

First, the CPU 11 of the user terminal 10 generates a copy template (ACT 11).

The copy template indicates settings regarding copying. The copy template is formed of a scan template and a print template.

The scan template indicates settings regarding scanning. For example, the scan template is formed of items such as a "paper size", a "color mode", and a "resolution" or "exposure". The "paper size" indicates a size of paper to be scanned. The "color mode" indicates whether scanning is performed in colors or monochrome. The "resolution" indicates the number of pixels to be scanned. The "exposure" indicates a scanning density. A configuration of the scan template is not limited to a specific configuration.

The print template indicates settings regarding printing. For example, the print template is formed of items such as "duplex", "number of copies", an "orientation", a "sort mode", and a "paper feeding source" or "Nin1". The "duplex" indicates duplex printing or simplex printing. The "number of copies" indicates the number of copies to be printed. The "orientation" indicates a printing orientation. The "paper feeding source" indicates a cassette or the like feeding paper. The "Nin1" indicates the number of images integrated into a single paper sheet. A configuration of the print template is not limited to a specific configuration.

The copy template may have a "name" item indicating the name thereof.

Figure 7:
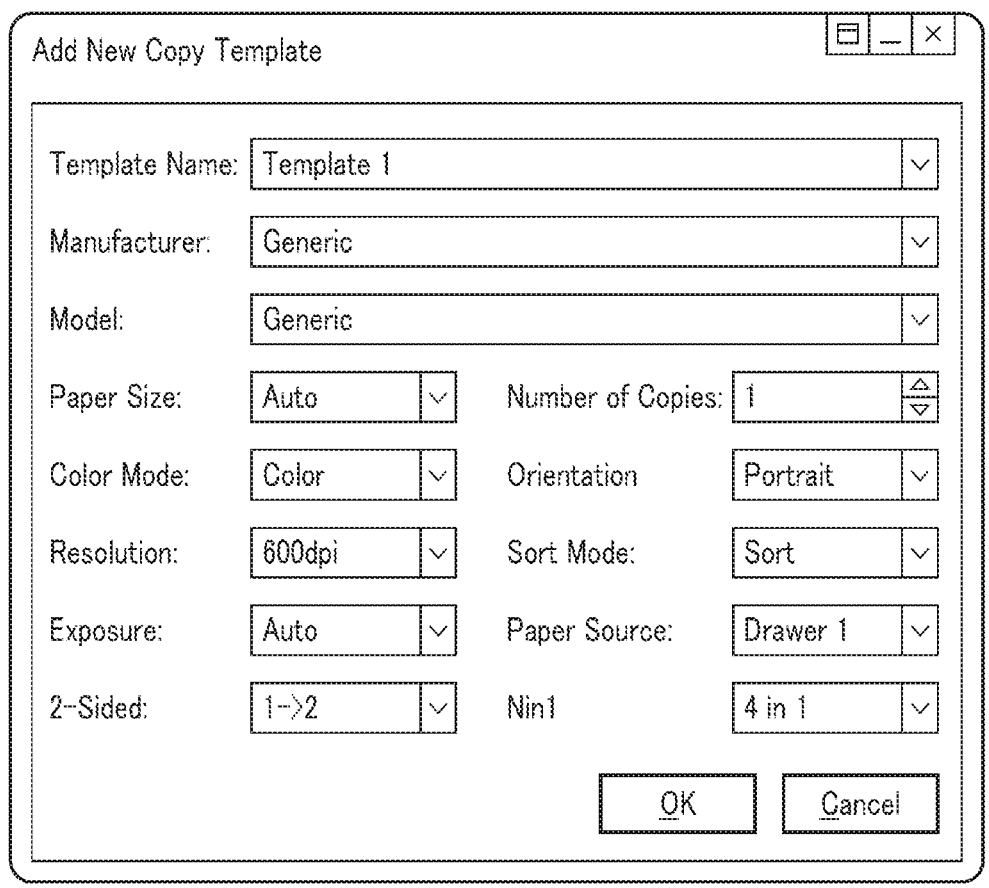
FIG. 7 is a diagram illustrating an example of an input screen of the user terminal.

For example, the CPU 11 displays an input screen for receiving input of each item of the copy template on the display unit 17. FIG. 7 illustrates an example of an input screen displayed by the CPU 11.

As illustrated in FIG. 7, the input screen receives input of "Template Name" (name).

The input screen receives, as the scan template, "Paper Size", "Color Mode", "Resolution", and "Exposure".

The input screen receives, as the print template, "2-Sided" (duplex), "Number of Copies", "Orientation", "Sort Mode", "Paper Source" (paper feeding source), and "Nin1".

The input screen may receive input of each item with a pull-down menu. The input screen may receive input of each item through text input.

A configuration of the input screen is not limited to a specific configuration.

The CPU 11 receives input of each item of the copy template via the input screen.

The CPU 11 generates the copy template on the basis of each input item. For example, the CPU 11 converts each input item to have an XML format so as to generate the copy template.

FIG. 8 illustrates an example of the copy template.

As illustrated in FIG. 8, the copy template is described in an XML format. For example, as illustrated in FIG. 8, in the copy template, a tag of an item indicates the content of the item. For example, the copy template includes elements indicating the content of items between a start tag and an end tag.

In the example illustrated in FIG. 8, the copy template displays "Auto" as the content of the "Exposure" item. The copy template displays "4in1" as the content of the "Nin1" item.

A configuration of the copy template is not limited to a specific configuration.

If the copy template is generated, the CPU 11 transmits the generated copy template to the server 20 via the communication unit 15 (ACT 12).

The CPU 21 of the server 20 receives the copy template via the communication unit 25. If the copy template is received, the CPU 21 stores the received copy template in the storage region 24a of the NVM 24 (ACT 13).

If the CPU 21 stores the copy template, the copy system 1 finishes the operation thereof.

Next, a description will be made of an operation example (ACT 11) in which the CPU 11 of the user terminal 10 generates the copy template.

FIG. 9 is a flowchart for explaining the operation example in which the CPU 11 generates the copy template.

First, the CPU 11 accesses the server 20 via the communication unit 15 (ACT 21). For example, the CPU 11 sends a predetermined request to the server 20 so as to establish communication.

If the server 20 is accessed, the CPU 11 displays an input screen (for example, FIG. 7) on the display unit 17 (ACT 22). If the input screen is displayed, the CPU 11 receives input of each item in the input screen via the operation unit 16 (ACT 23).

If the input of each item is received, the CPU 11 converts each input item to have an XML format so as to generate the copy template (ACT 24). If the copy template is generated, the CPU 11 finishes the operation thereof.

The CPU 11 of the user terminal 10 may generate a plurality of copy templates and transmit the copy templates to the server 20. For example, the server 20 may store the plurality of copy templates transmitted from the user terminal 10.

Next, a description will be made of an operation example in which the copy system 1 performs copying according to the copy template.

Figure 10:
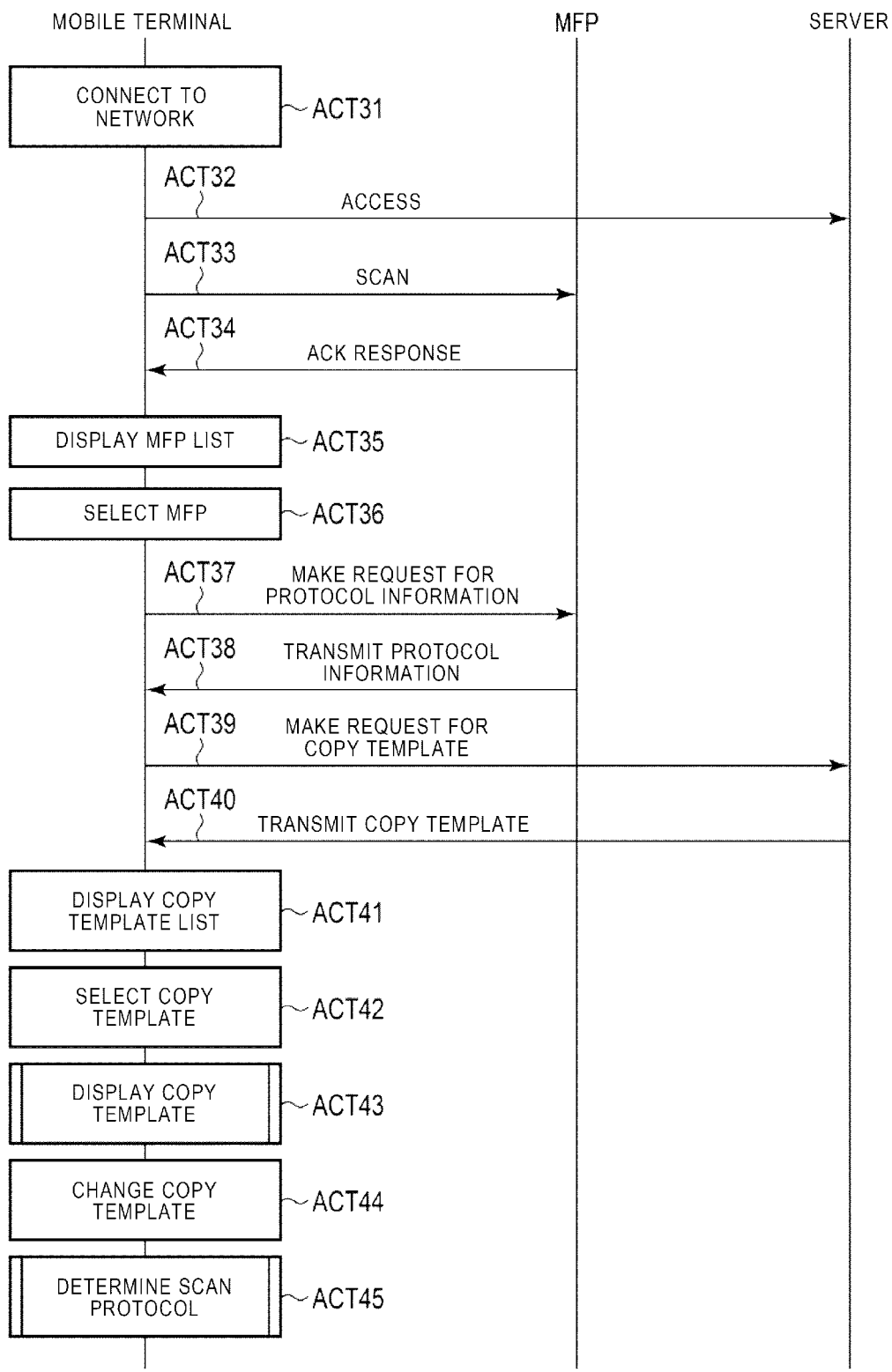
FIG. 10 is a sequence diagram illustrating an operation example of the copy system.
Figure 11:
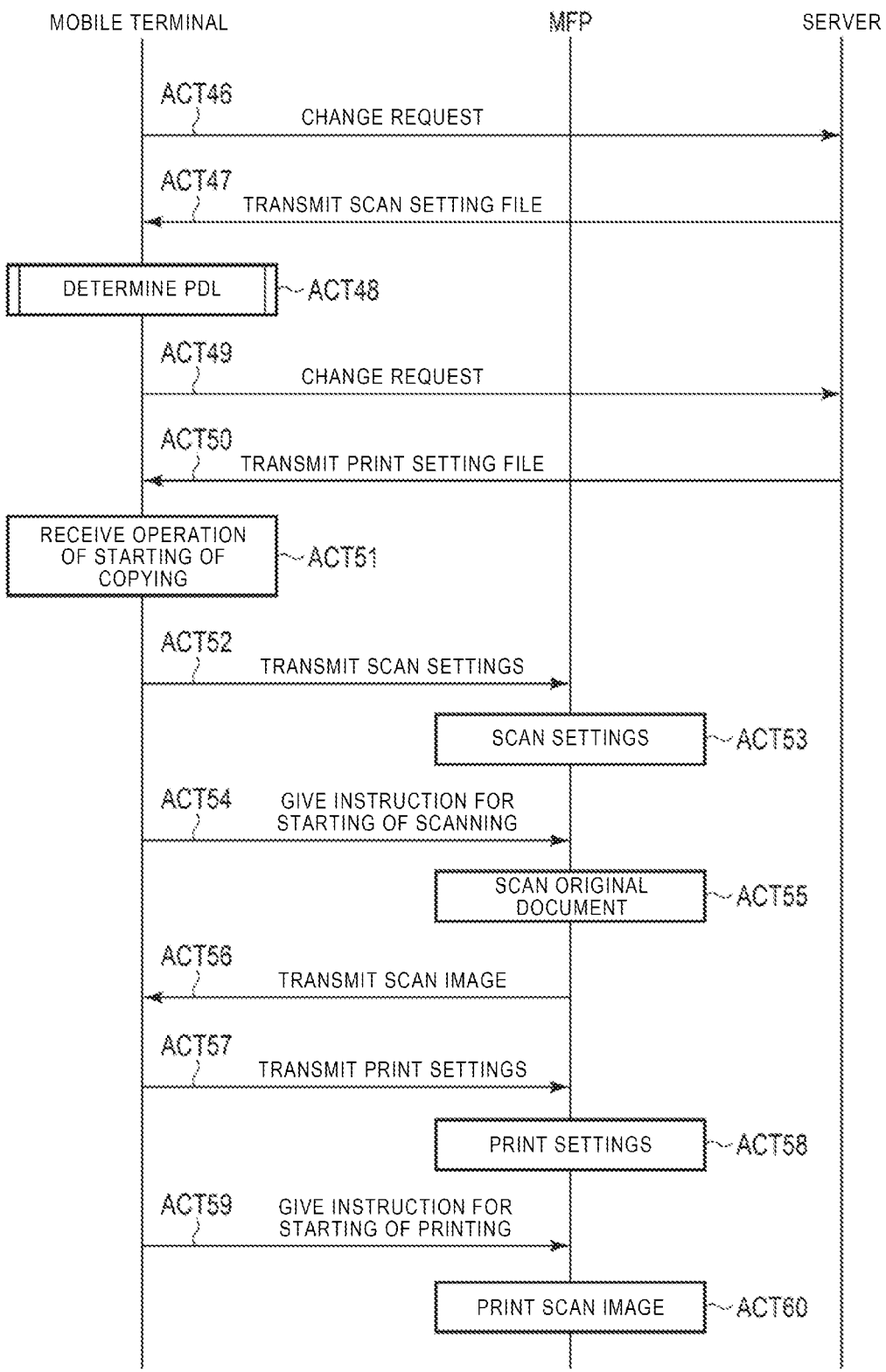
FIG. 11 is a sequence diagram illustrating an operation example of the copy system.

FIGS. 10 and 11 are sequence diagrams for explaining an operation example in which the copy system 1 performs copying according to the copy template. Here, a user is assumed to have the mobile terminal 50 and to be present in a communication region of the router 30. In other words, the mobile terminal 50 is assumed to be present in a communicable region with the router 30.

First, the CPU 51 of the mobile terminal 50 is connected to a network (for example, Wi-Fi) formed by the router 30 via the communication unit 55 (ACT 31). If the CPU 51 is connected to the network, the CPU 51 activates a browser or a dedicated application according to an operation from the user, so as to perform the following operations.

The CPU 51 accesses the server 20 via the communication unit 55 (ACT 32). For example, the CPU 51 may access the server 20 via the router 30, and may access the server 20 via other networks (communication carrier network).

If the server 20 is accessed, the CPU 51 transmits a scan signal for scanning MFPs which are connected to the router 30 (ACT 33). For example, the NVM 54 of the mobile terminal 50 stores sysObjectID of a detectable MFP in advance. For example, the CPU 51 downloads sysObjectID of the detectable MFP from the server 20 in advance, and stores sysObjectID in the NVM 54.

For example, the CPU 51 searches for an MFP hit by sysObjectID by using a broadcast based on Simple Network Management Protocol (SNMP).

The CPU 41 of the MFP 40 receives a scan signal via the communication unit 45. If the scan signal is received, the CPU 41 transmits an ACK response to the mobile terminal 50 via the communication unit 45 (ACT 34). Here, other MFPs are assumed to transmit ACK responses to the mobile terminal 50 in response to the scan signal.

The CPU 51 of the mobile terminal 50 receives the ACK responses from the MFP 40 and other MFPs via the communication unit 55. If the ACK responses are received, the CPU 51 displays a list of the MFPs having transmitted the ACK responses (ACT 35).

For example, the CPU 51 acquires an IP address, a model (for example, sysDescr), and a device name of an MFP hit by sysObjectID. For example, the CPU 51 acquires IP addresses and models from the MFPs. The CPU 51 acquires device names of the MFPs from a DNS server (not illustrated).

For example, the CPU 51 displays the IP addresses, the models, and the device names of the MFPs in a list form.

Figure 12:
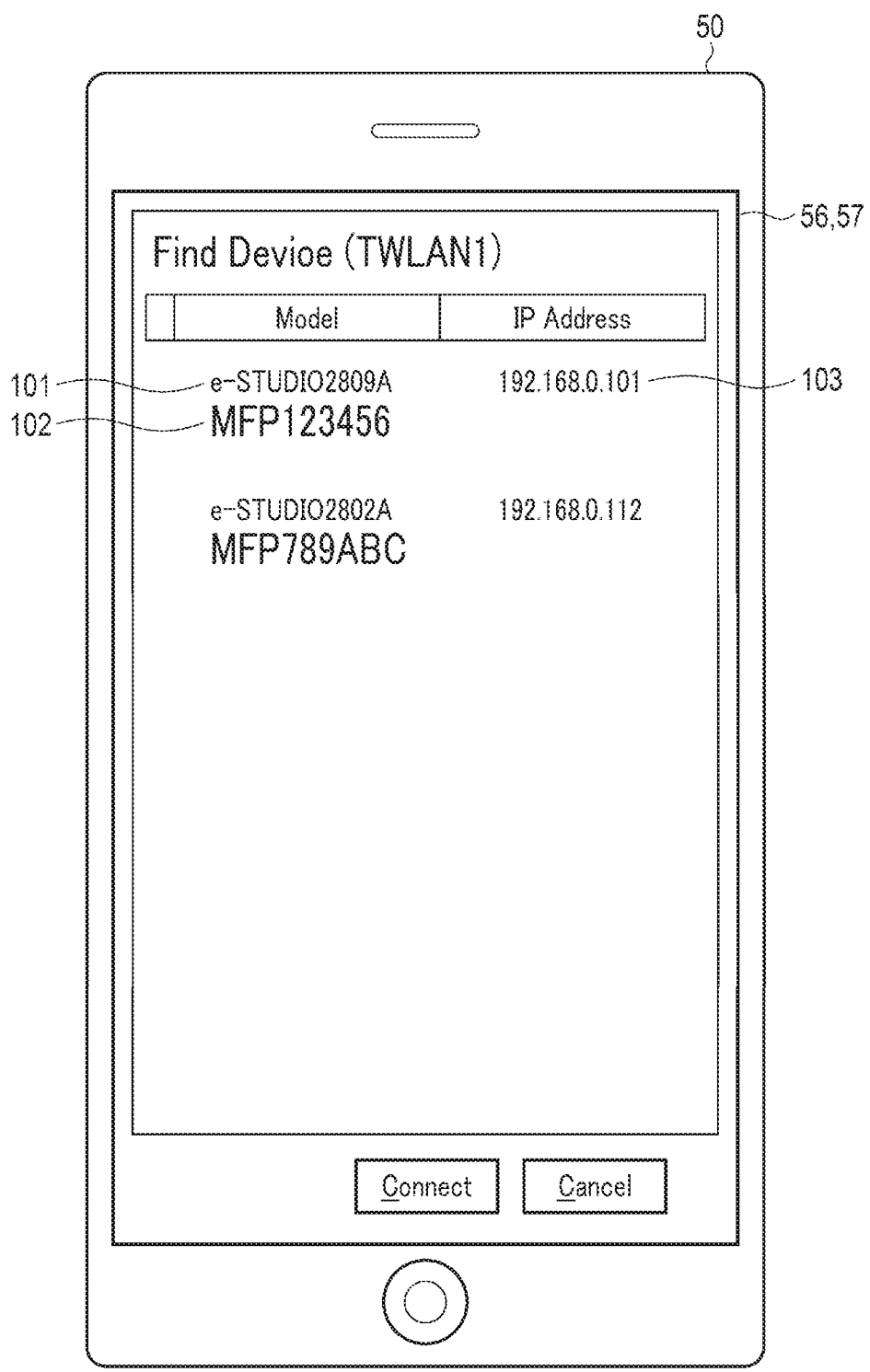
FIG. 12 is a diagram illustrating a display example of the mobile terminal.

FIG. 12 illustrates an example of a screen (MFP list screen) on which the CPU 51 displays a list of the MFPs.

As illustrated in FIG. 12, the MFP list screen includes display regions 101 to 103. The display region 101 displays a model of an MFP. The display region 102 displays a device name of the MFP. The display region 103 displays an IP address of the MFP.

The MFP list screen may display a connected network name (here, TWLAN1).

A configuration of the MFP list screen is not limited to a specific configuration.

If the list of the MFPs is displayed, the CPU 51 selects an MFP which will perform copying (ACT 36). For example, the CPU 51 receives an operation of selecting an MFP from the user via the operation unit 56.

The CPU 51 detects a touch on an IP address, a model, or a device name on the MFP list screen, and brings an MFP into a selection state. The CPU 51 selects the MFP in the selection state by detecting a touch on a "Connect" icon.

Here, the CPU 51 is assumed to select the MFP 40.

If the MFP 40 is selected, the CPU 51 makes a request for information (protocol information) indicating a scan protocol and a print protocol supported by the MFP 40 via the communication unit 55 (ACT 37).

The CPU 41 of the MFP 40 receives the request for protocol information via the communication unit 45. The CPU 41 transmits protocol information indicating a scan protocol and a print protocol supported by the MFP 40 to the mobile terminal 50 via the communication unit 45 (ACT 38).

The CPU 51 of the mobile terminal 50 receives the protocol information via the MFP 40. If the CPU 41 does not have a function of transmitting information indicating a scan protocol and a print protocol supported by the MFP 40, the CPU 51 may acquire information indicating a scan protocol and a print protocol corresponding to a model of the MFP 40 from the server 20.

The CPU 51 may transmit the protocol information or the like to the server 20. The CPU 41 of the MFP 40 may transmit the protocol information to the server 20.

If the protocol information is received from the MFP 40, the CPU 51 transmits a request for a copy template to the server 20 via the communication unit 55 (ACT 39).

The CPU 21 of the server 20 receives the request via the communication unit 25. If the request is received, the CPU 21 transmits the copy template stored in the storage region 24a to the mobile terminal 50 via the communication unit 25 (ACT 40). The CPU 21 may transmit a plurality of copy templates.

The CPU 51 of the mobile terminal 50 receives the copy template from the server 20 via the communication unit 55. Here, the CPU 51 is assumed to receive a plurality of copy templates.

If the copy templates are received, the CPU 51 displays a list of the copy templates on the display unit 17 (ACT 41). For example, the CPU 51 displays names of the received templates in a list form.

Figure 13:
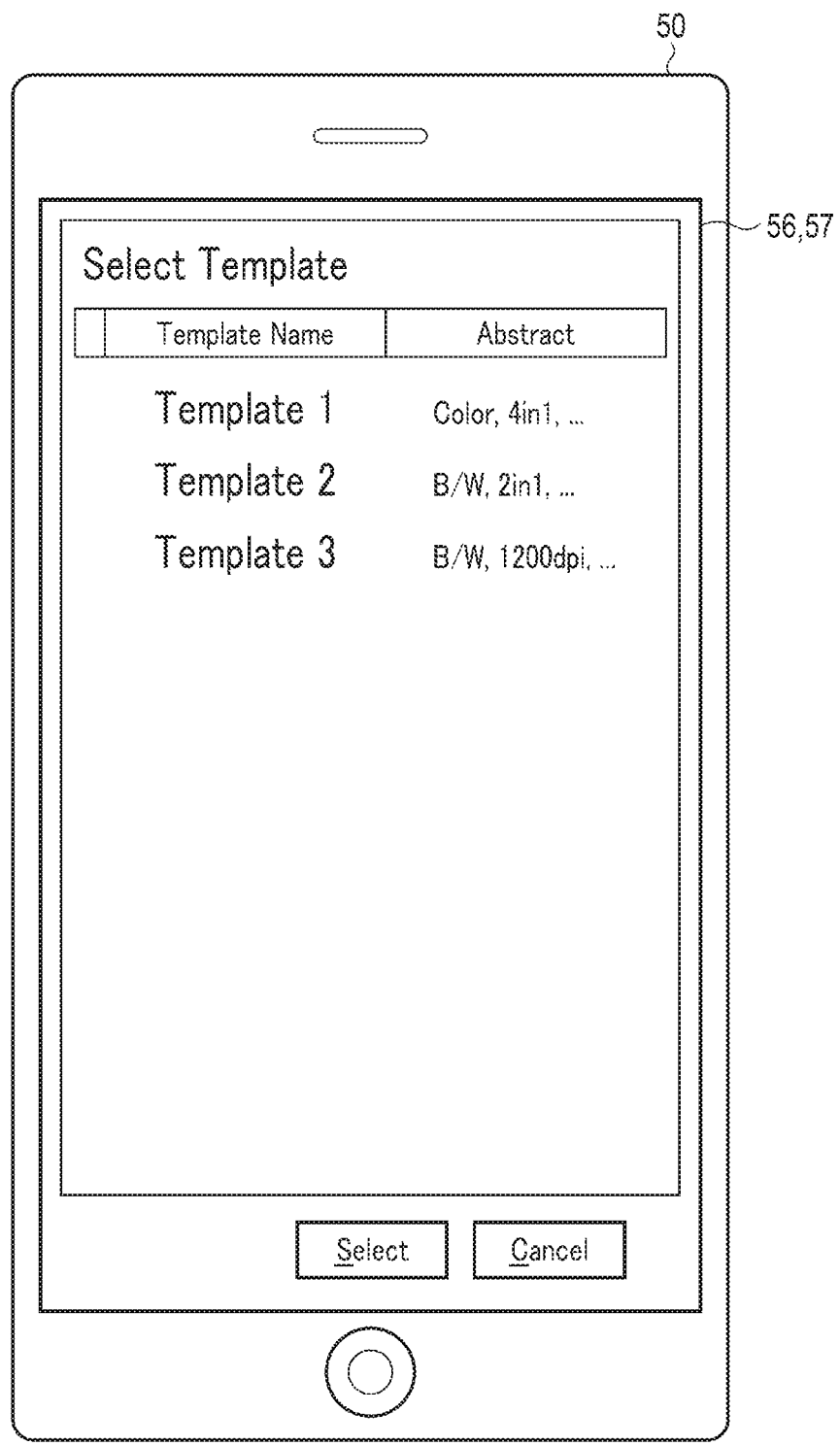
FIG. 13 is a diagram illustrating a display example of the mobile terminal.

FIG. 13 illustrates an example of a screen (template list screen) on which the CPU 51 displays a list of copy templates.

As illustrated in FIG. 13, the template list screen displays template names in a list form. The template list screen may display "Abstract" which abstracts the content of the templates.

If the list of the copy templates is displayed, the CPU 51 selects a copy template used for copying in the MFP 40 (ACT 42). For example, the CPU 51 receives an operation of selecting a copy template from the user via the operation unit 56.

For example, the CPU 51 detects a touch on a template name on the template list screen, and brings a copy template into a selection state. The CPU 51 selects the copy template in the selection state as a copy template used for copying by detecting a touch on a "Select" icon.

If a single copy template is received from the server 20, the CPU 51 selects the copy template as a copy template used for copying.

If the copy template is selected, the CPU 51 displays the copy template on the display unit 17 (ACT 43). For example, the CPU 51 displays each item of the copy template.

The CPU 51 changes an item display form as follows depending on a function supported by the MFP 40.

If the MFP 40 supports a function of an item of the copy template, the CPU 51 normally displays the item.

If the MFP 40 does not support a function of an item of the copy template, but there is a substitute function, the CPU 51 displays that the item has the substitute function. For example, the CPU 51 adds information (for example, exclamation mark) indicating that there is the substitute function (with restriction) to the item.

For example, if the MFP 40 does not support duplex printing at an automatic setting, but supports the duplex printing at a manual setting, the CPU 51 adds an exclamation mark to the "duplex" item.

If the MFP 40 supports a resolution which is different from a resolution set in the "resolution" item of the copy template, the CPU 51 adds an exclamation mark to the "resolution" item.

If the MFP 40 does not support a function of an item of the copy template, and there is no substitute function, the CPU 51 displays that the item is invalid. For example, the CPU 51 grays out the item.

For example, if the MFP 40 does not support color printing, the CPU 51 grays out the "color mode" item.

Figure 14:
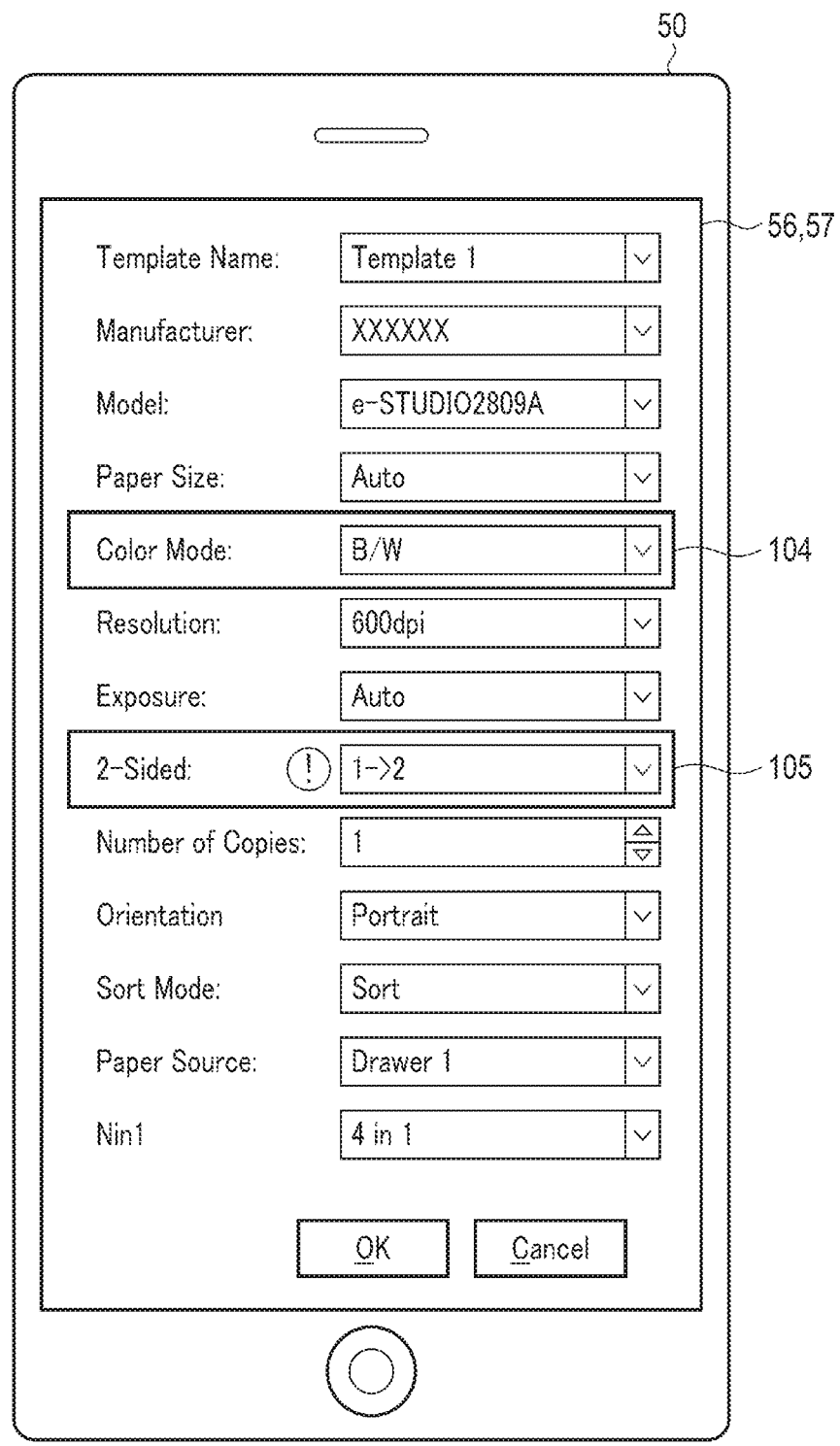
FIG. 14 is a diagram illustrating a display example of the mobile terminal.

FIG. 14 illustrates an example of a display screen on which the CPU 51 displays the copy template.

As illustrated in FIG. 14, the display screen displays the items of the copy template and the content of the items in correlation with each other. Here, a case where the MFP 40 does not support color printing, and there is no substitute function is assumed. Thus, the display screen displays the "Color Mode" item in a grayed-out manner as indicated by a frame 104.

Here, a case where the MFP 40 does not support duplex printing but has a substitute function is assumed. Thus, an exclamation is added to the "2-Side" (duplex) item on the display screen as indicated by a frame 105.

If the copy template is displayed, the CPU 51 receives a change of the copy template via the operation unit 56 (ACT 44). For example, the CPU 51 receives the change on the display screen. For example, the CPU 51 displays a pull-down menu and receives the change. For example, after a changing operation on each item is received, the CPU 51 establishes a change of each item if a touch on an "OK" icon is detected.

The CPU 51 may not receive a change according to an operation from the user. For example, if a touch on the "OK" icon is detected without receiving a changing operation, the CPU 51 establishes the copy template without changing the copy template.

If a change of the copy template is received, the CPU 51 determines a scan protocol used for scan setting of the MFP 40 (ACT 45). Here, the protocol information is assumed to indicate a plurality of scan protocols.

For example, the CPU 51 displays a list of the scan protocols on the display unit 57. The CPU 51 receives an operation of selecting a single scan protocol from the list of the scan protocols via the operation unit 56.

Figure 15:
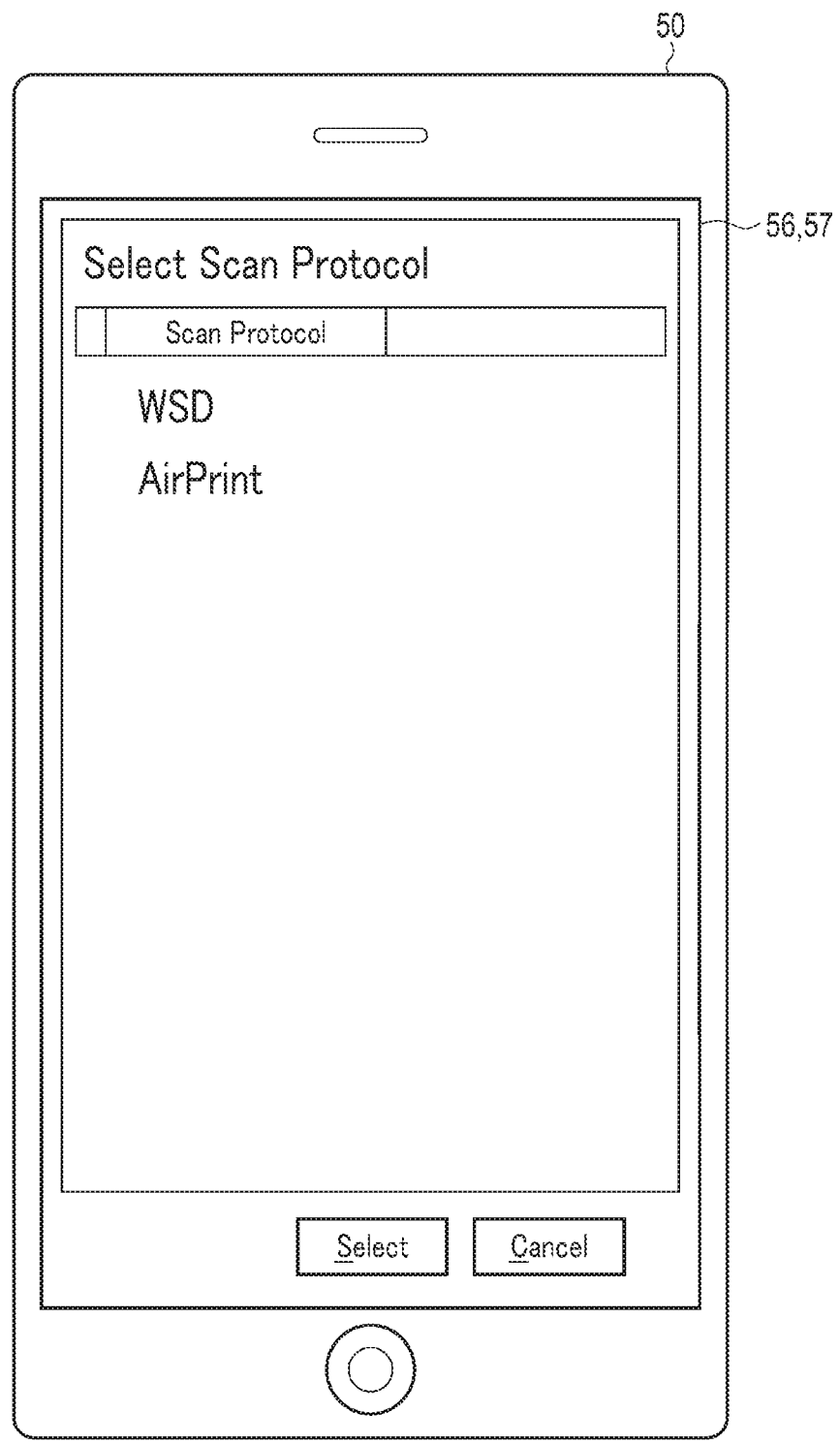
FIG. 15 is a diagram illustrating a display example of the mobile terminal.

FIG. 15 illustrates an example of a screen (scan protocol list screen) on which the CPU 51 displays the list of the scan protocols.

As illustrated in FIG. 15, the scan protocol list screen displays names of a plurality of scan protocols. Here, the scan protocol list screen displays WSD (Web Services on Devices) and AirPrint as the names of the scan protocols.

For example, the CPU 51 detects a touch on a name of a scan protocol on the scan protocol list screen, and brings the scan protocol into a selection state. The CPU 51 detects a touch on a "Select" icon, and determines the scan protocol in the selection state as a scan protocol used for scan setting of the MFP 40.

If the protocol information indicates a single scan protocol, the CPU 51 determines the scan protocol as a scan protocol used for scan setting of the MFP 40.

If the scan protocol is determined, the CPU 51 transmits a request for a scan setting file to the server 20 via the communication unit 55 (ACT 46). For example, the CPU 51 requests the server 20 to transmit a scan setting file into which the scan template of the copy template is converted according to a format corresponding to the determined scan protocol.

The CPU 51 may transmit the scan template (or the copy template) to the server 20. If an item of the scan template is changed in ACT 44, the CPU 51 may transmit the scan template (or the copy template) to the server 20.

The CPU 21 of the server 20 receives the request for a scan setting file via the communication unit 25. The CPU 21 converts the scan template of the copy template stored in the storage region 24a or the scan template received from the mobile terminal 50 to a format corresponding to the scan protocol, so as to generate a scan setting file. For example, the CPU 21 extracts elements regarding the scan template from an XML file of the copy template, and converts the elements to have a format corresponding to the scan protocol.

FIG. 16 illustrates a configuration example of the scan setting file.

The scan setting file shows an example in which "exposure" is set to "Auto". A setting regarding "exposure" in FIG. 8 is converted as indicated by boldface portions.

The CPU 21 transmits the generated scan setting file to the mobile terminal 50 via the communication unit 25 (ACT 47).

The CPU 51 of the mobile terminal 50 receives the scan setting file via the communication unit 55. If the scan setting file is received, the CPU 51 determines a page description language (PDL) used for printing (ACT 48).

For example, the CPU 51 determines a print protocol used for print setting of the MFP 40 and then determines a PDL used for printing.

First, a description will be made of determination of a print protocol. Here, the protocol information is assumed to indicate a plurality of print protocols.

For example, the CPU 51 displays a list of the print protocols on the display unit 57. The CPU 51 receives an operation of selecting a single print protocol from the list of the print protocols via the operation unit 56.

Figure 17:
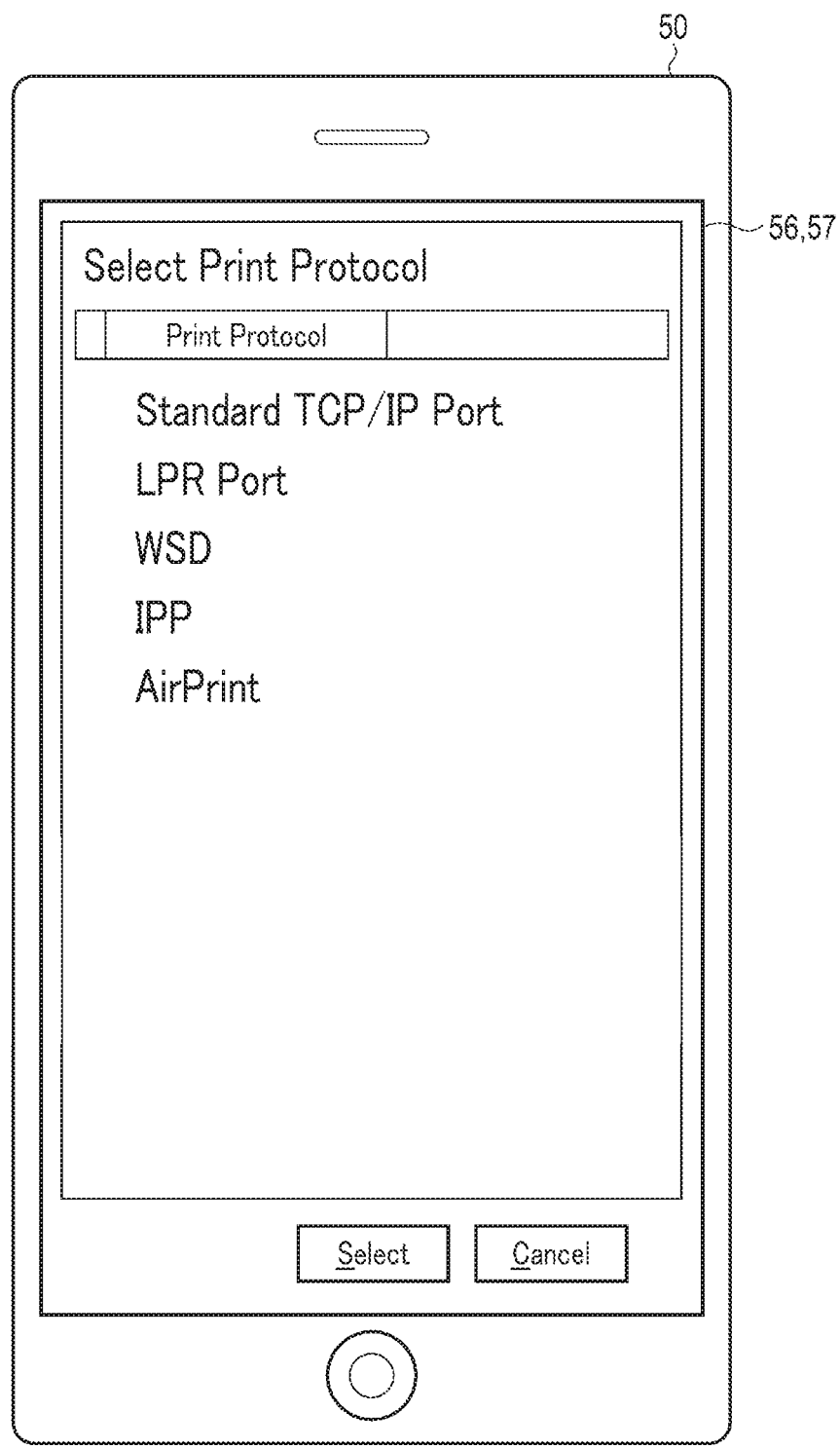
FIG. 17 is a diagram illustrating a display example of the mobile terminal.

FIG. 17 illustrates an example of a screen (print protocol list screen) on which the CPU 51 displays the list of the print protocols.

As illustrated in FIG. 17, the print protocol list screen displays names of a plurality of print protocols. Here, the print protocol list screen displays Standard TCP/IP Port, LPR Port, WSD, IPP, and AirPrint as the names of the print protocols.

For example, the CPU 51 detects a touch on a name of a print protocol on the print protocol list screen, and brings the print protocol into a selection state. The CPU 51 detects a touch on a "Select" icon, and determines the print protocol in the selection state as a print protocol used for print setting of the MFP 40.

If the protocol information indicates a single print protocol, the CPU 51 determines the print protocol as a print protocol used for print setting of the MFP 40.

Next, a description will be made of determination of a PDL. Here, a case where there are a plurality of PDLs corresponding to the determined print protocol is assumed.

For example, the CPU 51 displays a list of the PDLs on the display unit 57. The CPU 51 receives an operation of selecting a single PDL from the list of the PDLs via the operation unit 56.

Figure 18:
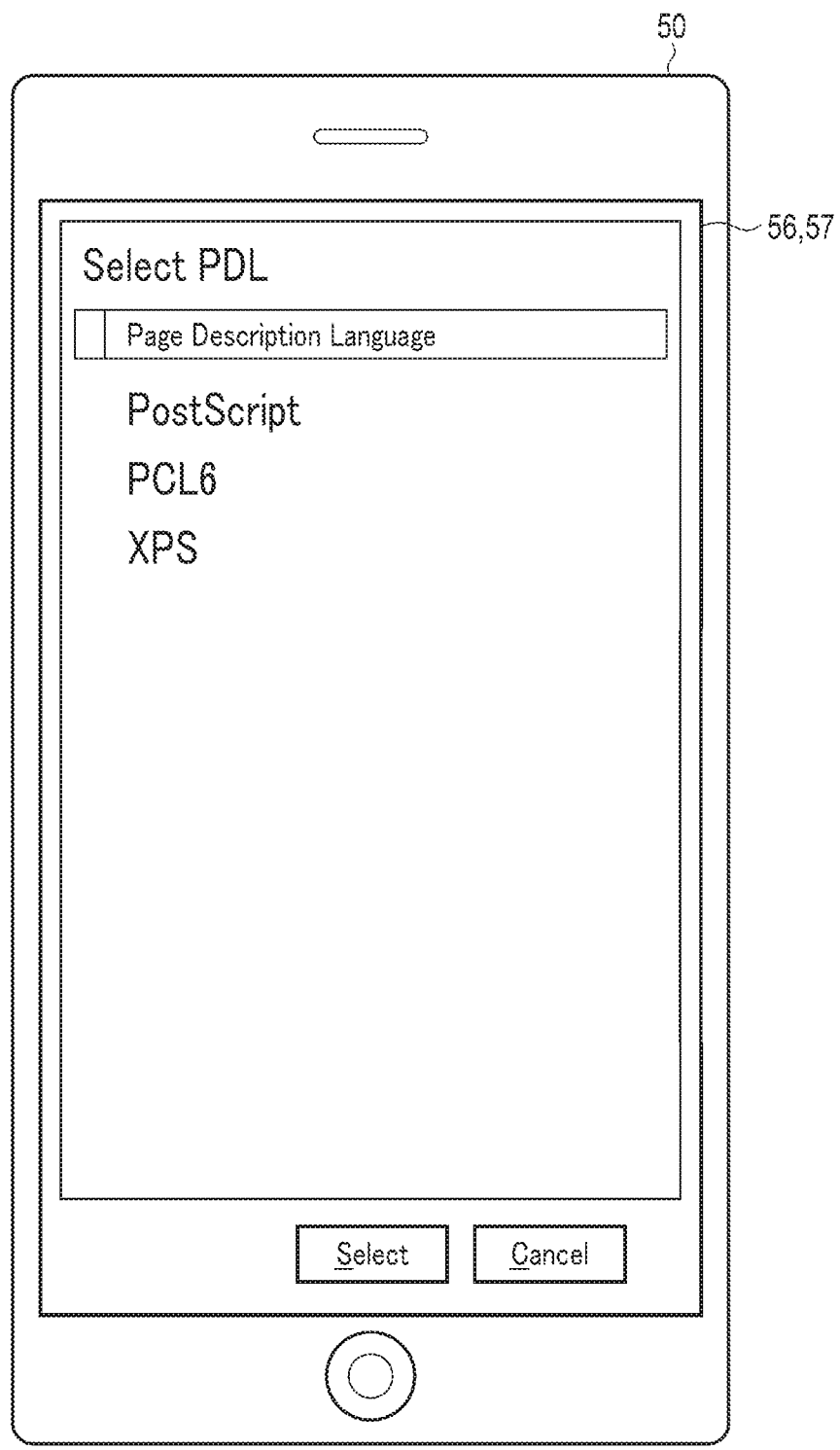
FIG. 18 is a diagram illustrating a display example of the mobile terminal.

FIG. 18 illustrates an example of a screen (PDL list screen) on which the CPU 51 displays the list of the PDLs.

As illustrated in FIG. 18, the PDL list screen displays names of a plurality of PDLs. Here, the PDL list screen displays PostScript, PCL6, and XPS as the names of the PDLs.

For example, the CPU 51 detects a touch on a name of a PDL on the PDL list screen, and brings the PDL into a selection state. The CPU 51 detects a touch on a "Select" icon, and determines the PDL in the selection state as a PDL used for printing.

If there is a single PDL corresponding to the print protocol, the CPU 51 determines the PDL as a PDL for printing.

If the PDL is determined, the CPU 51 transmits a request for a print setting file to the server 20 via the communication unit 55 (ACT 49). For example, the CPU 51 requests the server 20 to transmit a print setting file into which the print template of the copy template is converted according to a format corresponding to the determined PDL.

The CPU 51 may transmit the print template (or the copy template) to the server 20. If an item of the print template is changed in ACT 44, the CPU 51 may transmit the print template (or the copy template) to the server 20.

The CPU 21 of the server 20 receives the request for a print setting file via the communication unit 25. The CPU 21 converts the print template of the copy template stored in the storage region 24a or the print template received from the mobile terminal 50 to a format corresponding to the PDL, so as to generate a print setting file. For example, the CPU 21 extracts elements regarding the print template from an XML file of the copy template, and converts the elements to have a format corresponding to the PDL.

FIG. 19 illustrates a configuration example of the print setting file.

The print setting file shows an example in which "Nin1" is set to "4in1". A setting regarding "Nin1" in FIG. 8 is converted as indicated by boldface portions.

The CPU 21 transmits the generated print setting file to the mobile terminal 50 via the communication unit 25 (ACT 50).

The CPU 51 of the mobile terminal 50 receives the print setting file via the communication unit 55. If the print setting file is received, the CPU 51 receives an operation of starting copying via the operation unit 56 (ACT 51).

For example, the CPU 51 displays an icon for receiving an operation of starting copying on the display unit 57. The CPU 51 detects a touch on the icon so as to receive an operation of starting copying.

Figure 20:
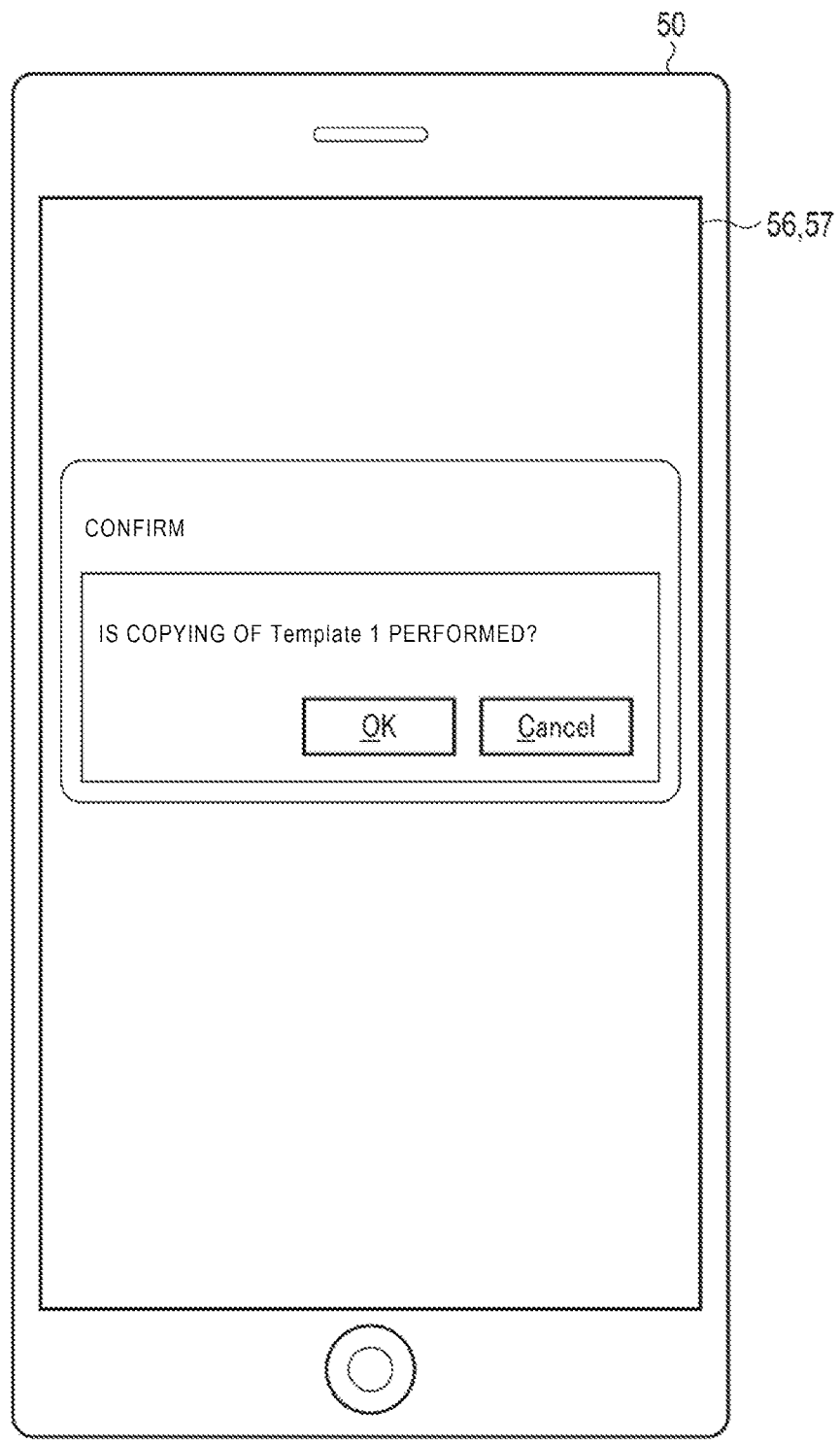
FIG. 20 is a diagram illustrating a display example of the mobile terminal.

FIG. 20 illustrates an example of a screen (copying starting screen) displayed in order for the CPU 51 to receive an operation of starting copying.

As illustrated in FIG. 20, the copying starting screen displays an "OK" icon. The CPU 51 determines that an operation of starting copying is received via the operation unit 56 if a touch on the "OK" icon is detected.

An original document is assumed to be set on the MFP 40 at the time up to ACT 51.

If the operation of staring copying is received, the CPU 51 transmits scan settings to the MFP 40 on the basis of the scan setting file via the communication unit 55 (ACT 52). In other words, the CPU 51 performs setting regarding scanning on the MFP 40.

The CPU 41 of the MFP 40 receives the scan settings via the communication unit 45. If the scan settings are received, the CPU 41 sets the received scan settings in the MFP 40 (ACT 53).

If the CPU 41 sets the scan settings in the MFP 40, the CPU 51 of the mobile terminal 50 instructs the MFP 40 to start scanning via the communication unit 55 (ACT 54). For example, the CPU 51 transmits a scan signal for starting scanning to the MFP 40.

The CPU 41 of the MFP 40 receives the instruction for starting of scanning via the communication unit 45. If the instruction for starting of scanning is received, the CPU 41 scans the set original document by using the scanner 46 (ACT 55).

If the original document is scanned, the CPU 41 transmits a scan image obtained through the scanning to the mobile terminal 50 via the communication unit 45 (ACT 56).

The CPU 51 of the mobile terminal 50 receives the scan image from the MFP 40 via the communication unit 55. If the scan image is received, the CPU 51 transmits print settings to the MFP 40 on the basis of the print setting file via the communication unit 55 (ACT 57). In other words, the CPU 51 performs setting regarding printing on the MFP 40.

The CPU 41 of the MFP 40 receives the print settings via the communication unit 45. If the print settings are received, the CPU 41 sets the received print settings in the MFP 40 (ACT 58).

If the CPU 41 sets the print settings in the MFP 40, the CPU 51 of the mobile terminal 50 instructs the MFP 40 to start printing of the scan image via the communication unit 55 (ACT 59). For example, the CPU 51 transmits a print signal for starting printing of the scan image to the MFP 40. For example, the CPU 51 may cause the scan image to be included in the print signal. The CPU 51 may separately transmit the scan image as an image to be printed by using the print signal, to the MFP 40.

The CPU 41 of the MFP 40 receives the instruction for starting of printing via the communication unit 45. If the instruction for starting of printing is received, the CPU 41 prints the scan image according to the print signal by using the image forming unit 47 (ACT 60).

If the CPU 41 prints the scan image, the copy system 1 finishes the operation thereof.

The CPU 51 of the mobile terminal 50 may display the scan image on the display unit 57. If the scan image is displayed, and then a predetermined operation is received, the CPU 51 may transmit a print signal to the MFP 40.

Next, a description will be made of an operation example (ACT 43) in which the CPU 51 displays the copy template.

Figure 21:
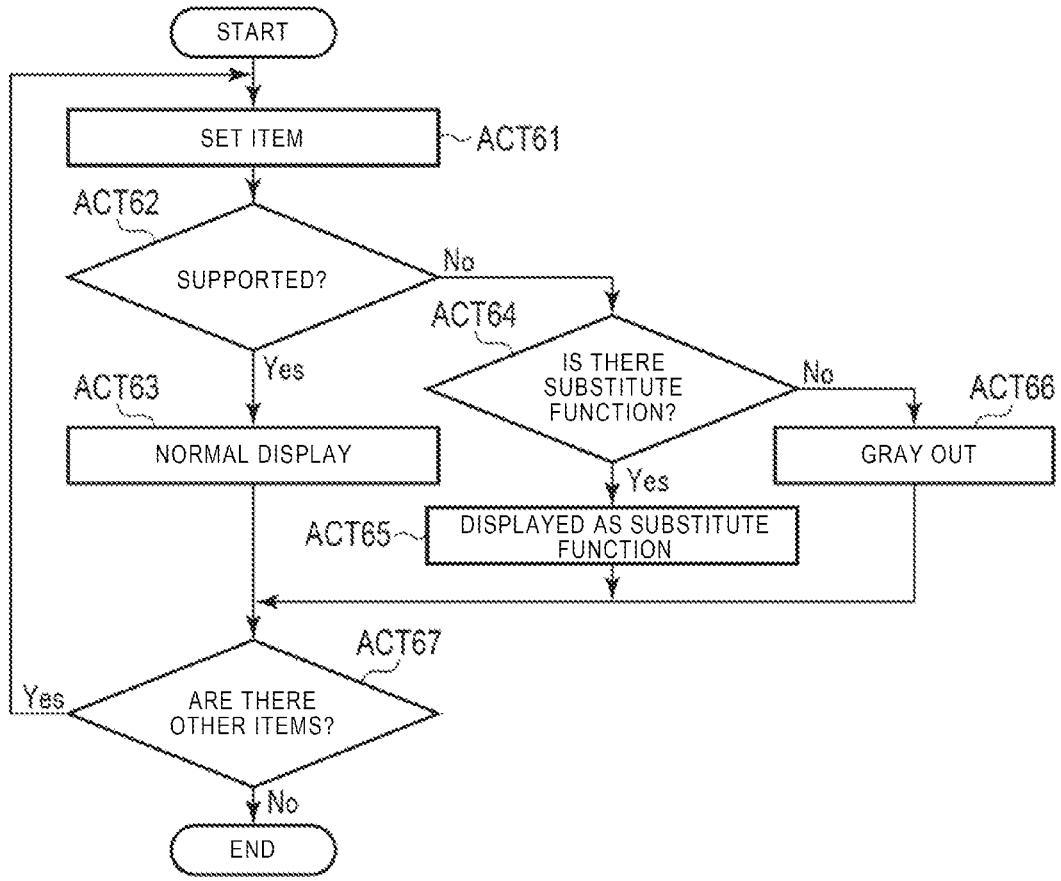
FIG. 21 is a flowchart illustrating an operation example of the mobile terminal.

FIG. 21 is a flowchart for explaining the operation example in which the CPU 51 displays the copy template.

First, the CPU 51 sets an item for determining a display form (ACT 61).

If the item is set, the CPU 51 determines whether or not the MFP 40 supports a function of the item (ACT 62). For example, the CPU 51 may acquire a supported function from the MFP 40. The CPU 51 may acquire a function supported by the MFP 40 from the server 20.

If the function of the item is determined as being supported by the MFP 40 (ACT 62, YES), the CPU 51 determines that the item is normally displayed (ACT 63).

If the function of the item is determined as not being supported by the MFP 40 (ACT 62, NO), the CPU 51 determines whether or not there is a substitute function (ACT 64).

If the CPU 51 determines that there is a substitute function (ACT 64, YES), the CPU 51 determines that information indicating that there is the substitute function is added to the item which is then displayed (ACT 65).

If the CPU 51 determines that there is no substitute function (ACT 64, NO), the CPU 51 determines that the item is displayed in a grayed-out manner (ACT 66).

If the item is determined as being normally displayed (ACT 63), information indicating that there is the substitute function is determined as being added to the item which is then displayed (ACT 65), or the item is determined as being displayed in a grayed-out manner (ACT 66), the CPU 51 determines whether or not there are other items (ACT 67).

If the CPU 51 determines that there are other items (ACT 67, YES), the CPU 51 returns to ACT 61.

If the CPU 51 determines that there are no other items (ACT 67, NO), the CPU 51 finishes the operation thereof.

Next, a description will be made of an operation example (ACT 45) in which the CPU 51 determines a scan protocol.

Figure 22:
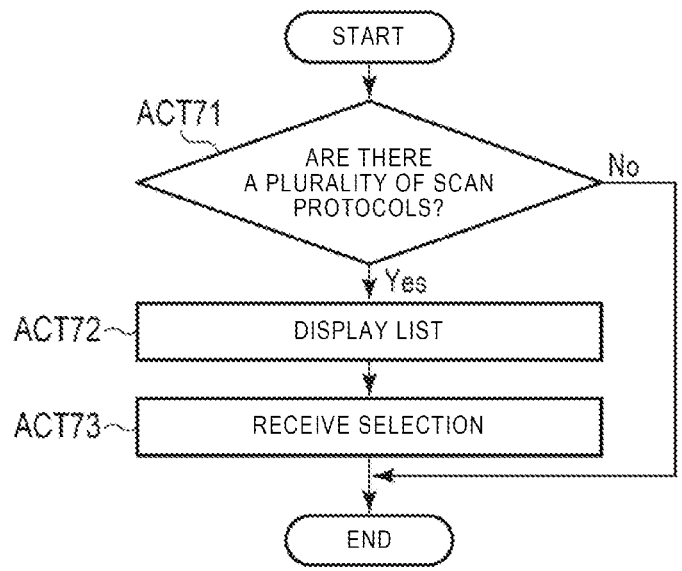
FIG. 22 is a flowchart illustrating an operation example of the mobile terminal.

FIG. 22 is a flowchart for explaining the operation example in which the CPU 51 determines a scan protocol.

First, the CPU 51 determines whether or not the protocol information indicates a plurality of scan protocols (ACT 71). If the protocol information is determined as indicating a plurality of scan protocols (ACT 71, YES), the CPU 51 displays a list of the plurality of scan protocols (for example, FIG. 15) on the display unit 57 (ACT 72).

If the list of the plurality of scan protocols is displayed, the CPU 51 receives selection of a scan protocol via the operation unit 56 (ACT 73).

If the protocol information is determined as indicating a single scan protocol (ACT 71, NO), or selection of a scan protocol is received (ACT 73), the CPU 51 finishes the operation thereof.

Next, a description will be made of an operation example (ACT 48) in which the CPU 51 determines a PDL.

Figure 23:
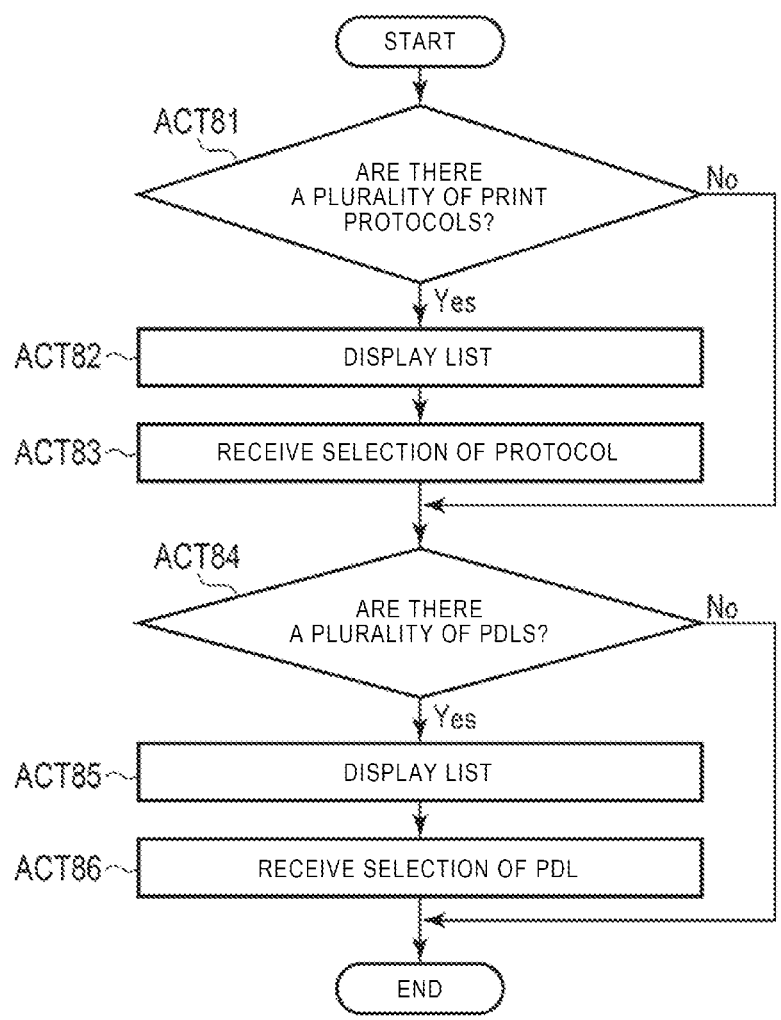
FIG. 23 is a flowchart illustrating an operation example of the mobile terminal.

FIG. 23 is a flowchart for explaining the operation example in which the CPU 51 determines a PDL.

First, the CPU 51 determines whether or not the protocol information indicates a plurality of print protocols (ACT 81). If the protocol information is determined as indicating a plurality of print protocols (ACT 81, YES), the CPU 51 displays a list of the plurality of print protocols (for example, FIG. 17) on the display unit 57 (ACT 82).

If the list of the plurality of print protocols is displayed, the CPU 51 receives selection of a print protocol via the operation unit 56 (ACT 83).

If the protocol information is determined as indicating a single print protocol (ACT 81, NO), or selection of a print protocol is received (ACT 83), the CPU 51 determines whether or not there are a plurality of PDLs corresponding to the single print protocol indicated by the protocol information or the selected print protocol (ACT 84).

If the CPU 51 determines that there are a plurality of PDLs (ACT 84, YES), the CPU 51 displays a list of the plurality of PDLs (for example, FIG. 18) on the display unit 57 (ACT 85).

If the list of the plurality of PDLs is displayed, the CPU 51 receives selection of a PDL via the operation unit 56 (ACT 86).

If the CPU 51 determines that there is a single PDL (ACT 84, NO), or selection of a PDL is received (ACT 86), the CPU 51 finishes the operation thereof.

The mobile terminal 50 may store a copy template. For example, the CPU 51 may receive input of each item of a copy template via the operation unit 56, and may store the copy template in the NVM 54. The CPU 51 may cause the MFP 40 to perform scanning and printing according to a copy template stored in the NVM 54.

The CPU 51 may generate a scan setting file or a print setting file. The CPU 51 may store a scan setting file or a print setting file in the NVM 54 in advance.

The user terminal 10 and the mobile terminal 50 may be the same terminal.

The copy system 1 may operate in an on-premise environment. The server 20 may transmit a scan starting signal to the MFP 40. The MFP 40 may transmit a scan image to the server 20. The server 20 may transmit a print signal to the MFP 40.

The copy system configured in the above-described way generates a scan setting file and a print setting file on the basis of a copy template. The copy system sets the scan setting file in the MFP 40 to scan an original document. The copy system sets the print setting file in the MFP 40 to print an image of the original document. Therefore, the copy system can set the copy template in the MFP 40 by dividing the copy template into scan settings and print settings. As a result, the copy system can cause the MFP 40 which does not cope with a copy template, to perform copying according to the copy template. Therefore, the copy system can perform copying according to predetermined copy settings regardless of a model of an MFP.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An information processing system, comprising:
a processor; and
a memory that stores executable instructions that, when executed by the processor, facilitate performance of operations, comprising:
storing a copy template comprising a plurality of settings for an image forming apparatus to execute a functionality associated with the image forming apparatus, the plurality of settings comprising a first setting representing a scanning function and a second setting representing a printing function;
facilitating receiving, by a user computing device, of the copy template, wherein the user computing device identifies the image forming apparatus based on use of a simple network management protocol broadcast message and an identifier associated with the image forming apparatus stored to a data readable and writable nonvolatile memory associated with the user computing device;
facilitating selection, by a user interface operational on the user computing device, of a scanning protocol supported by the image forming device;
in response to receiving the scanning protocol, converting the first setting to comply with the scanning protocol;
facilitating selection, by the user interface, of a printing protocol supported by the image forming device;
in response to receiving the printing protocol, converting the second setting to comply with the printing protocol; and
in response to receiving input from the user computing device, performing the scanning function as modified by the scanning protocol and the printing function as modified by the printing protocol.

2. The system according to claim 1, the operations further comprising:
facilitating receiving, by the user computing device, of a scan of an image from the image forming apparatus;
facilitating transmission, by the user computing device, of the scan of the image to the image forming apparatus; and
printing the scan of the image based on the printing function as modified by the printing protocol.

3. The system according to claim 1, the operations further comprising:
acquiring a copy template comprising a scan template and a print template;
setting the scan function based on the scan template; and
setting the print function based on the print template.

4. The system according to claim 1, further comprising:
acquiring a scan setting file based on a scan protocol corresponding to image forming apparatus;
transmitting the scan setting file to the image forming apparatus;
acquiring a print setting file based on a print protocol corresponding to the image forming apparatus; and
transmitting the print setting file to the image forming apparatus.

5. A computer readable storage device comprising executable instructions that, in response to execution, cause a system comprising a processor to perform operations, comprising:
storing a copy template comprising a plurality of settings for an image forming apparatus to execute a function associated with the image forming apparatus, the plurality of settings comprising a first setting representing a scanning function and a second setting representing a printing function;
facilitating receiving, by a user computing device, of the copy template, wherein the user computing device identifies the image forming apparatus based on use of a simple network management protocol broadcast message and an identifier associated with the image forming apparatus stored to a data readable and writable nonvolatile memory associated with the user computing device;
facilitating selection, by a user interface operational on the user computing device, of a scanning protocol supported by the image forming device;
in response to receiving the scanning protocol, converting the first setting to comply with the scanning protocol;
facilitating selection, by the user interface, of a printing protocol supported by the image forming device;
in response to receiving the printing protocol, converting the second setting to comply with the printing protocol; and
in response to receiving input from the user computing device, performing the scanning function as modified by the scanning protocol and the printing function as modified by the printing protocol.

* * * * *